(12) United States Patent
Storey et al.

(10) Patent No.: US 11,693,935 B2
(45) Date of Patent: Jul. 4, 2023

(54) AUTOMATED AUTHENTICATION SYSTEMS AND METHODS INCLUDING AUTOMATED WASTE MANAGEMENT SYSTEM WITH AUTOMATED WEIGHT TICKET AND AUTHENTICATION

(71) Applicant: OVERCAST HOLDINGS, LLC, Norcross, GA (US)

(72) Inventors: Jason C. Storey, Johns Creek, GA (US); Shane Foye, Brookhaven, GA (US)

(73) Assignee: OVERCAST HOLDINGS, LLC, Norcross, GA (US)

( * ) Notice: Subject to any disclaimer, the term of this patent is extended or adjusted under 35 U.S.C. 154(b) by 418 days.

(21) Appl. No.: 17/049,933

(22) PCT Filed: Apr. 23, 2019

(86) PCT No.: PCT/US2019/028773
§ 371 (c)(1),
(2) Date: Oct. 22, 2020

(87) PCT Pub. No.: WO2019/209861
PCT Pub. Date: Oct. 31, 2019

(65) Prior Publication Data
US 2021/0081516 A1    Mar. 18, 2021

Related U.S. Application Data

(60) Provisional application No. 62/661,278, filed on Apr. 23, 2018.

(51) Int. Cl.
G06F 21/31    (2013.01)
H04W 4/029    (2018.01)
(Continued)

(52) U.S. Cl.
CPC .............. *G06F 21/31* (2013.01); *G06F 21/64* (2013.01); *G06Q 10/30* (2013.01); *G06Q 30/04* (2013.01);
(Continued)

(58) Field of Classification Search
CPC ........................................................ G06F 21/31
(Continued)

(56) References Cited

U.S. PATENT DOCUMENTS

| 7,878,392 B2* | 2/2011 | Mayers ................. G06Q 10/08 235/375 |
| 2005/0080520 A1* | 4/2005 | Kline ..................... B65F 1/062 701/1 |

(Continued)

FOREIGN PATENT DOCUMENTS

| WO | 02/06994 A2 | 1/2002 |
| WO | 2016/187243 A1 | 11/2016 |
| WO | 2017/074716 A1 | 5/2017 |

OTHER PUBLICATIONS

European Patent Office. Extended European Search Report. Issued in European Application No. 19793594.3 dated Dec. 8, 2021. 7 pages.

(Continued)

*Primary Examiner* — Dant B Shaifer Harriman
(74) *Attorney, Agent, or Firm* — Meunier Carlin & Curfman LLC

(57) ABSTRACT

Disclosed and described herein are systems and methods that bring together edge technologies into a single, streamlined process that automates the tracking and usage of assets (containers, equipment, mobile storage, etc.). These systems and methods include the use of smart beacons, low power cellular, sensors (strain gauges, level, contact, ohm/voltage, etc.), voice, video, microcontroller advancements, and the (Continued)

like. Conventional systems that have electronic service order and/or tickets are still limited in their functionality because of data, communication and processing hurdles. Disclosed are modern electronic data capture systems (IoT sensors) along with algorithms to assist on the tracking of assets and workers, more quickly capture authorized transactions for billing and remove the manual processes.

28 Claims, 14 Drawing Sheets

(51) Int. Cl.
    *H04W 12/63*     (2021.01)
    *G06F 21/64*     (2013.01)
    *G06Q 10/30*     (2023.01)
    *G06Q 30/04*     (2012.01)
    *H04L 9/32*      (2006.01)
    *H04L 9/40*      (2022.01)
    *H04W 12/06*     (2021.01)
    *H04L 9/00*      (2022.01)

(52) U.S. Cl.
    CPC ............ *H04L 9/3239* (2013.01); *H04L 63/08* (2013.01); *H04W 4/029* (2018.02); *H04W 12/06* (2013.01); *H04W 12/63* (2021.01); *G06F 2221/2111* (2013.01); *H04L 9/50* (2022.05); *H04L 2209/56* (2013.01); *H04L 2209/84* (2013.01); *H04L 2463/082* (2013.01)

(58) Field of Classification Search
    USPC ........................................................... 726/7
    See application file for complete search history.

(56) References Cited

U.S. PATENT DOCUMENTS

| | | | |
|---|---|---|---|
| 2009/0099897 A1* | 4/2009 | Ehrman | G06Q 10/063114 705/7.15 |
| 2011/0116899 A1 | 5/2011 | Dickens | |
| 2013/0054139 A1 | 2/2013 | Bodin et al. | |
| 2014/0012773 A1 | 1/2014 | Matthews | |
| 2014/0045428 A1* | 2/2014 | Mohn | G07C 5/0858 455/41.2 |
| 2014/0357295 A1* | 12/2014 | Skomra | G08G 1/202 455/456.1 |
| 2014/0366090 A1* | 12/2014 | Murray | G06Q 40/12 726/3 |
| 2015/0101038 A1* | 4/2015 | Hong | G06F 21/6227 726/17 |
| 2016/0189067 A1 | 6/2016 | Law et al. | |
| 2017/0193191 A1* | 7/2017 | Blum | G16H 20/13 |
| 2017/0326411 A1* | 11/2017 | Watterson | A63B 22/0214 |
| 2018/0117446 A1* | 5/2018 | Tran | A42B 3/0433 |
| 2018/0374327 A1* | 12/2018 | Enekwa | G08B 13/246 |
| 2019/0120929 A1* | 4/2019 | Meadow | H04L 9/3236 |
| 2019/0318389 A1* | 10/2019 | Proctor, Jr. | G06Q 20/4015 |
| 2020/0117690 A1* | 4/2020 | Tran | G06F 16/90332 |
| 2020/0294336 A1* | 9/2020 | Levy | G06K 7/1413 |
| 2020/0374113 A1* | 11/2020 | Noam | G06F 21/64 |

OTHER PUBLICATIONS

International Search Report and Written Opinion issued by the International Searching Authority (ISA/US) in PCT Application No. PCT/US2019/028773 dated Aug. 15, 2019. 9 pages.

* cited by examiner

FIG. 10B

FIG. 10C

AUTOMATED AUTHENTICATION SYSTEMS AND METHODS INCLUDING AUTOMATED WASTE MANAGEMENT SYSTEM WITH AUTOMATED WEIGHT TICKET AND AUTHENTICATION

CROSS-REFERENCE TO RELATED APPLICATIONS

This application is a national stage application filed under 35 U.S.C. § 371 of PCT/US2019/028773 filed Apr. 23, 2019, which claims priority to and benefit of U.S. provisional patent application Ser. No. 62/661,278 filed Apr. 23, 2018, both of which are hereby incorporated by reference in their entireties and made a part hereof.

FIELD OF THE INVENTION

Embodiments of the present invention relate generally to automated authentication systems and methods and more particularly to the application of automated authentication methods and systems to waste management.

BACKGROUND

Waste management has generally been conducted using several disparate systems with an extensive amount of manual data manipulation, tracking, input, billing and asset tracking. These disparate systems often do not communicate with one another and may have inefficient manual components. The application of modern technology to track assets, load pickup and discharge, routing, and billing, can lead to increased efficiency and lest losses by the operator

BRIEF SUMMARY

Disclosed and described herein are systems and methods that bring together edge technologies into a single, streamlined process that automates the tracking and usage of assets (containers, equipment, mobile storage, etc.). These systems and methods include the use of Smart Beacons, Low Power Cellular, Sensors (strain gauges, level, contact, ohm/voltage, etc.), Voice, Video, Microcontroller advancements, and the like.

Applications include automated ticketing/receipt when dumping waste. For example, when a driver of a vehicle carrying waste (an "asset") drives across a scale equipped with embodiments described herein, an associated weight ticket is automatically generated that is related directly to customer, driver and asset. The technology can also be used for parking lots, going to football game, etc. (anything that can read a unique identifier about a person or device and correlate it to a transaction). Identifiers can include, for example, biometric based app on a smartphone (TouchID validated), beacons, barcodes, RFID tags (active and passive), and the like.

Another application includes security focused route guidance (voice based). Using sensors on (waste) containers and GPS location data from a mobile device (e.g., smartphone, tablet, portable computer, etc.), the driver's workflow (completion times, pickup/dropoff, etc.) is automated. This application automates the tracking of assets (for example, if a waste can gets tilted it means it will be left or pulled), the system then checks proximity when moving away from service location to see if can was left or still on back of the waste vehicle.

Yet another application includes automated and real-time asset tracking. Data collected from the route automation is transmitted back to a central application and provides real time or near real time updates of equipment. Such an application is less expensive than GPS-based devices and more accurate. In this application, a "reader" is always active in a truck or a mobile app (for example, cell phones can be utilized as well and have the service running in the background so it's always looking for assets). The system is more accurate through proximity service of beacon. The assets can have metadata associated with them that is obtained by the reader. This allows the device to make a better decision without having to call back to central system (internal unique id, service history). The information may also be shared, if allowed (generally, the information is encrypted).

Other applications include the fully autonomous collection of waste. Routes are designated by time and date historical data for optimization (including current traffic patterns which then gets rolled into qualitative data set). Two types of autonomous waste collection include commercial and residential. Commercial, which includes frontend, and backend lift based services, comprises the (autonomous) vehicles sent routes from a routing system (updated real-time so, for example, if customer is delinquent but pays that morning, the system automatically reactivates that stop). The collection of waste cans includes gate or access control, and the can collected is weight tracked by sensors in the lift arms (strain gauges/accelerometers). Once collected, the trucks would be routed to dump at certain points based on the weight collected as to automatically comply with state and/or federal weight regulations. Also, the weight per can would be reported back to system. In one aspect there is also a sensor/beacon used on each can collected that guarantees vehicle made it to the stop in case something was blocking access. Open top and residential would work similar to commercial. The primary difference would require a human to perform any manual steps (hooking a can for example).

Another application includes consolidated collection. In this application, a compactor based device (trash pod) that is able to capture waste and compress it and put it onto a staged location. A primary example would allow things like recyclables to be shipped to recycle centers from that staged location with trucks that have more capacity and are dedicated. Local area is service through autonomous or manual control services. These "trash pods" can potentially be recyclable of the same collected material themselves so the processing facility just pulls and processes.

Yet another application comprises route optimization. In this application, each customer, driver, area and service type are individually examined against key performance indicators (KPI's) and an efficiency rating is generated against these metrics. This data can be compared against other customers in the system using the same KPIs and a ranking is derived. The rankings are broken into mathematical quartiles and used to provide recommendations to operators or autonomous systems on routes.

Disclosed and described herein are methods of asset retrieval using authentication, systems for implementing the methods, and computer program products comprising software for executing steps of the methods. One of the methods comprises receiving, by a mobile device located in a vehicle, a request for service; confirming and accepting, by the mobile device, the request for service; receiving, by the mobile device, information identifying at least the asset and a location of the asset; sending, by the mobile device, tracking information about the vehicle after acceptance of the request for service, wherein the tracking information is received by a computing system; receiving, by the mobile device, a request for authentication from a smart device associated with the asset as the vehicle approaches the asset; responding, by the mobile device, to the request for authentication from the smart device; and if the smart device associated with the asset receives a correct response from the mobile device, then transmitting meta information from the smart device to the mobile device; or if the smart device associated with the asset receives an incorrect response or no response from the mobile device, then not transmitting any information from the smart device to the mobile device.

In some instances, the smart device associated with the asset stores a globally unique identifier and the meta information about the asset, wherein the meta information about the asset can include one or more of last date the asset was serviced, last location of the asset, last service order number for the asset, weight of the asset, and volume of the asset.

In some instances, once the smart device associated with the asset receives a correct response, the globally unique identifier and the meta information about the asset is transmitted from the smart device to the mobile device. In some instances, the globally unique identifier and the meta information about the asset is then transmitted from the mobile device to the computing system. This may be accomplished using, for example, or more of a peer-to-peer system, a wireless cloud-based network, a cellular system, and the like.

In some instances, the globally unique identifier and the meta information about the asset transmitted from the mobile device to the computing system is used by a global ledger and transaction system executing on the computing system. The global ledger and transaction system executing on the computing system at least allows an owner or lessee of the asset and/or contents and/or type of asset to be identified. In some instances, additional information is transmitted from the mobile device to the computing system including one or more of vehicle identification, distance to arrival of location for unloading the asset or contents of the asset; weight of material contained in asset where such weight information may come from one or more of on-board vehicle scales, pre-weighed data stored in the smart device, cumulative amount of material collected in the asset, and the like. In some instances, the global ledger and transaction system creates an invoice for the owner or lessee of the asset based on globally unique identifier, the meta information and the additional information, which can be electronically transmitted to the owner or lessee of the asset.

In some instances, the asset comprises a trash bin, a ruggedized pod, or anything that holds items.

In some instances, the smart device associated with eth asset comprises a GPS transmitter and if the smart device associated with the asset receives an incorrect response or no response from the mobile device, and the asset is moved, the asset is flagged as stolen/compromised. In some instances, the smart device sends an alert signal when it is flagged as stolen/compromised.

In some instances, the request for authentication from the smart device associated with the asset as the vehicle approaches the asset is a request for multi-factor authentication.

In some instances, the mobile device is connected to one or more of a display screen, a camera mounted to view a front of the vehicle, a camera mounted to view a rear of the vehicle, a low power Bluetooth receiver, a cellular transceiver, a GPS, and one or more strain gauges wired to axles of the vehicle, wherein the one or more strain gauges are connected to an on-board analog to digital transmitter using Bluetooth.

In some instances, the asset is loaded onto the vehicle and a "pickup complete" signal is sent to the computing system from the mobile device. The "pickup complete" signal may be automatically generated by the mobile device based on one or more sensors on the asset and/or the vehicle, or "pickup complete" signal may be generated by the mobile device based on a driver of the vehicle making an entry into the mobile device that is in communication with the system.

In some instances, when the pickup complete signal is received by the computing system, software executing on the computing system sends information to a driver of the vehicle using the mobile device of a time required to take the asset to a desired location. For example, the desired location may be a scale of a landfill. In some instances, the scale is associated with a scale house computing system and the scale house computing system receives a broadcast from the mobile device when the mobile device is within a certain range of the scale to determine location from scale house, the scale house computing system reports a time back to the mobile device based on a backlog of vehicles trying to access the scale. In various instances, the mobile device may communicate directly with the scale house computing system, or the scale house computing system may communicate with the computing system and the computing system communicates with the mobile device (and vice-versa).

In some instances, when the vehicle arrives at the scale house, through a network of sensors, cameras (drones or fixed) and driver authorization, the scale house computing system automatically logs the vehicle in queue and direct the vehicle onto the scale. In some instances, once the vehicle is on the scale and stops, the driver is prompted by the mobile device for a fingerprint, retinal or simple PIN (some form of authentication) to certify who they are; the scale house computing system receives a response from the authentication of the driver to then read from the mobile device vehicle and asset information which is verified using the computing system; once the vehicle and asset information is verified, a picture of asset contents is captured by fixed cameras, drones or special types of cameras that can analyze composition of the contents through the container and a weight of the vehicle with the asset and contents of the asset is measured by the scale; and the driver is directed by the mobile device to a location to dump items in the asset.

In some instances, the driver returns the unloaded vehicle to the scale and re-authenticates to determine an empty weight of the vehicle and a weight of the items dumped is calculated, while in other instances an empty weight of the vehicle is electronically stored and a weight of the items dumped is calculated by the mobile device, scale house computing system or the computing system based on subtracting the empty weight of the vehicle from the weight of the vehicle with the asset and contents of the asset as measured by the scale.

In some instances, all information and data exchanged between the mobile device and the scale house computing system is transmitted to the computing system and stored in a central ledger system for interaction verification; and data required to execute a smart contract is properly formatted and submitted to a customer. In some instances, the smart contract is based on a blockchain infrastructure or other security measures.

Other objects and advantages will become apparent to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5 is an illustration of a scenario where a vehicle driver is sent a service request and is using a vehicle-mounted device with a screen, which includes sensors and connected devices such as camera front, camera rear, low power Bluetooth receiver, GSM, strain gauges wired to axles connecting to on board analog to digital transmitter using Bluetooth, and the like.

FIG. 8 illustrates a process for a fixed location such as waste facilities (scale houses), landfills, asset yards, and the like, wherein the location (e.g., client) is always scanning for the incoming vehicle that the driver is logged in with.

Figure 10B:
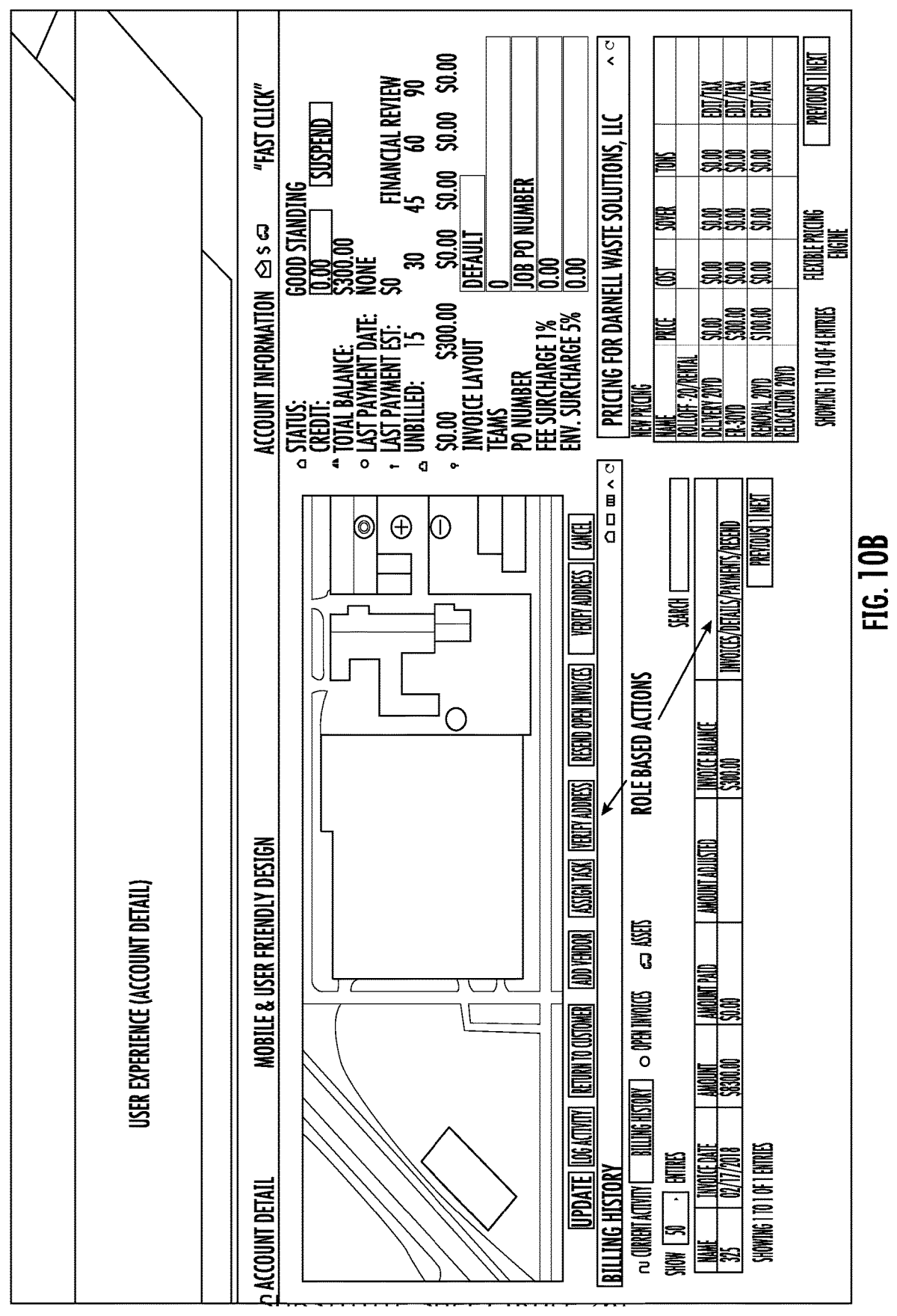
Figure 10C:
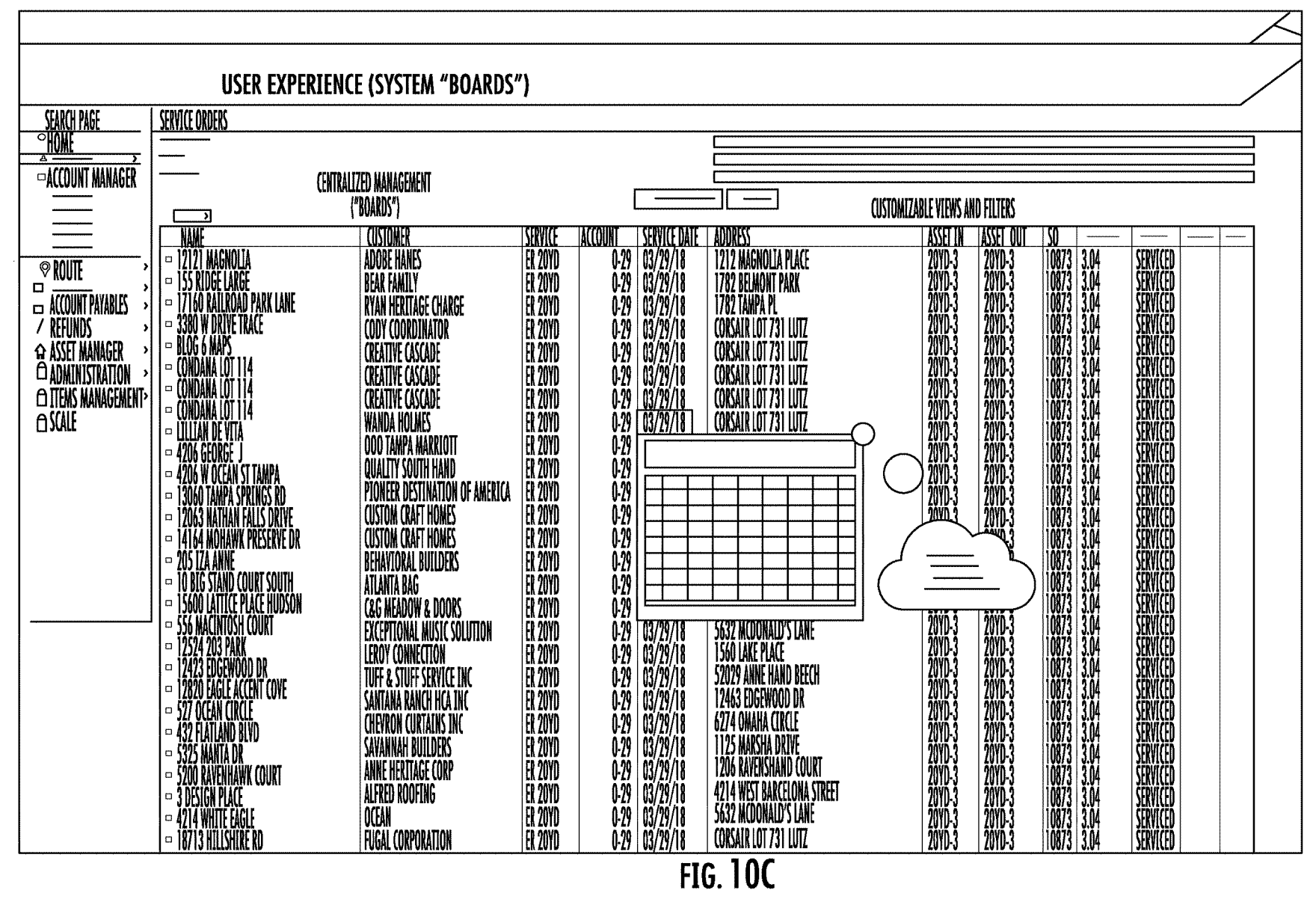

FIGS. 10A-10D illustrate exemplary GUIs for the disclosed system and methods.

DETAILED DESCRIPTION

Figure 1A:
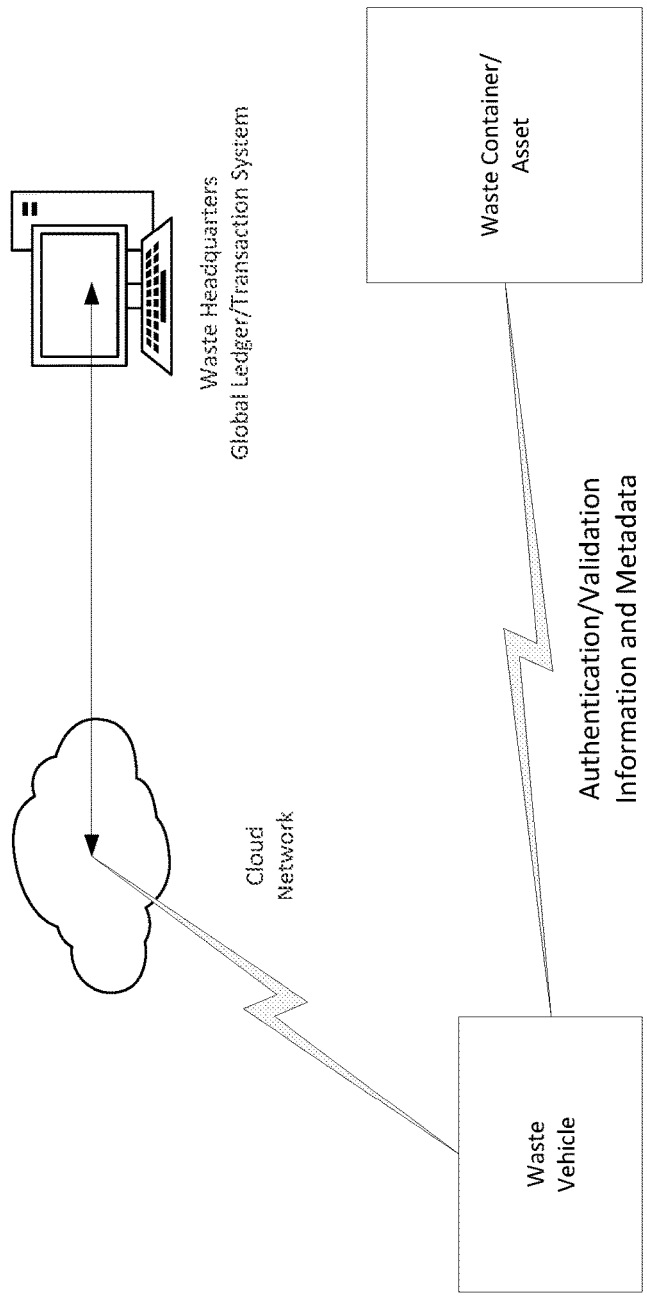
FIG. 1A is an overall block diagram illustrating aspects of embodiments of the present invention for asset verification/validation and automated transaction processing.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

A. Overview

Figure 1B:
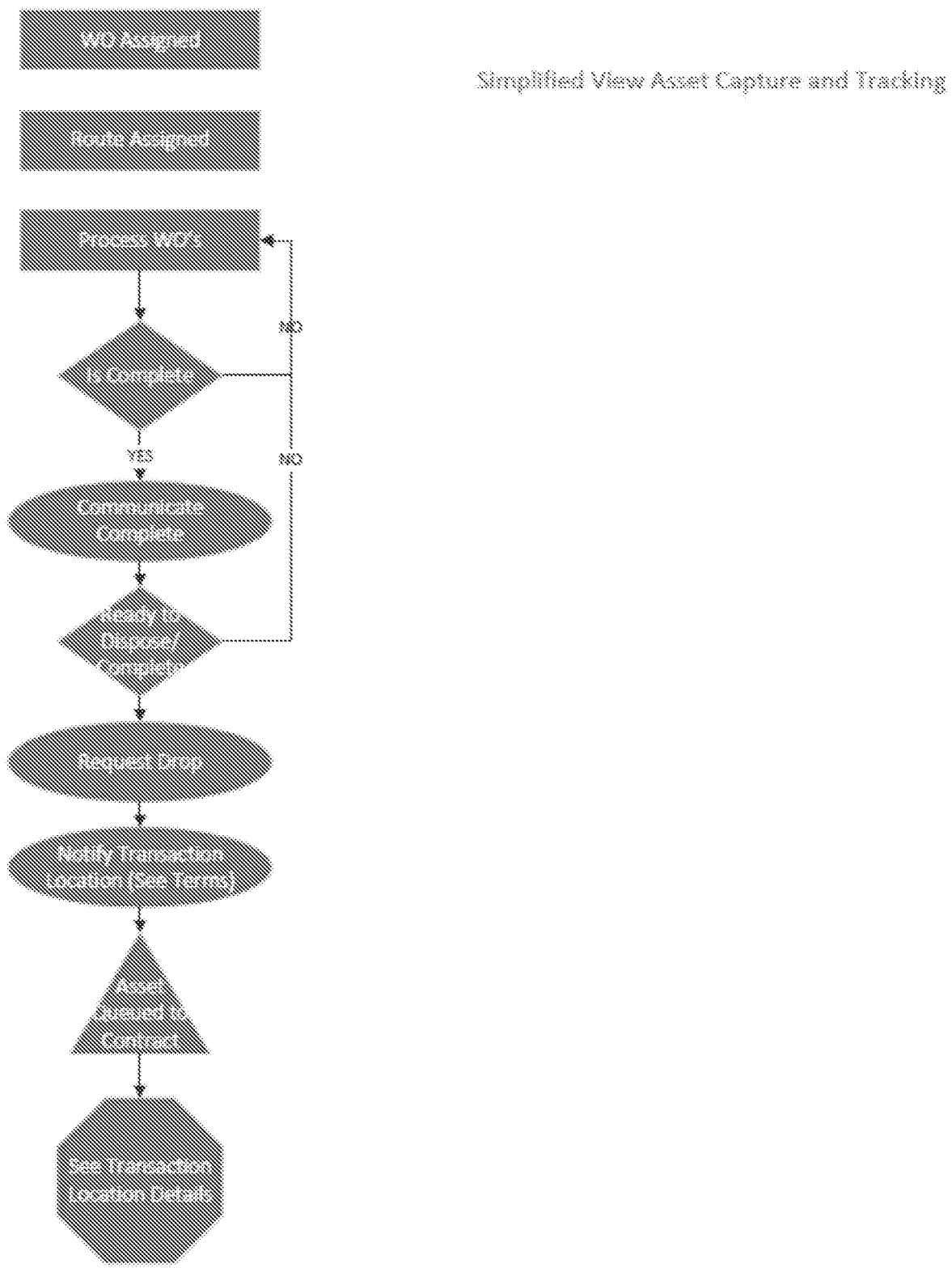
FIG. 1B is a flowchart that illustrates a simplified view of the asset capture and tracking process.

As shown in FIG. 1A, one aspect comprises asset verification/validation and automated transaction processing. In FIG. 1, as a waste vehicle approaches a smart asset, the smart asset (containers, stored items, etc.) has a sensor attached that stores a secured ID and meta information about the asset or assets. As used herein, a smart asset is a type of container or product that has a sensor tagged to it that holds not only a globally unique identifier, but also stores meta data about the asset (last serviced, last location, last service order, weight, volume, etc.). This data is read and updated securely through a multifactor authentication process that requires whoever is servicing and moving the asset, to request authorization. If authorization is not found and based on connectivity, the asset is flagged as stolen/compromised. The meta information from the sensor is pulled in and updated using a global ledger and transaction system. This allows the owner and contents or type of the container to be identified. A container could be anything from a trash bin, ruggedized pod to anything that holds items. The requirement to read this asset information requires the person moving or hauling the container to be authenticated and the results of that authentication becomes part of the authorization request for asset information. The information that can be read is from devices that have been verified authenticated (this verification can occur through blockchain based contracts, biometric or cryptographic elements that require the requester and the broadcaster to have an information to encrypt/decrypt data or with a simple pin). In the waste industry, the data read may comprise the following: Truck Identification; Asset/Container Identification; Distance to arrival; Weight of incoming material, where such weight information may come from one or more of on board scales, Pre-weighed data captured to onboard beacon, Cumulative amount collected (front end), and the like; Authenticated Device (minimum what even potentially without knowing who (smart contract]). FIG. 1B is a flowchart that illustrates a simplified view of the asset capture and tracking process.

Applications of the system/methods shown in described in FIG. 1 extend beyond waste management and may include, for example, inventory/asset management, management of parking lots, garages and storage, and the like. In inventory/asset management, such a system may be used for unit of measure (UoM) identification, Bill of Goods, UPC/SKU reconciliation, and the like. The disclosed system/method is an improvement on conventional technology in that it uses sensors that can look at weight and/or visual dimensions and correlate that back with the shipping and receiving data. This process imposes a validation/verification sequence that would be used for verification. With parking lots, garages and storage, the systems/methods identify the type of item and may include the use of an authenticated device (which could be a different person that is allowed to use). Availability and Asset Tracking is provided through sensors and can track both users approaching/leaving the lot (device) and Verifiable Vehicle tracking (camera, device). Once the data is read and verified the transaction is automatically recorded to all parties involved without human intervention.

Figure 2:
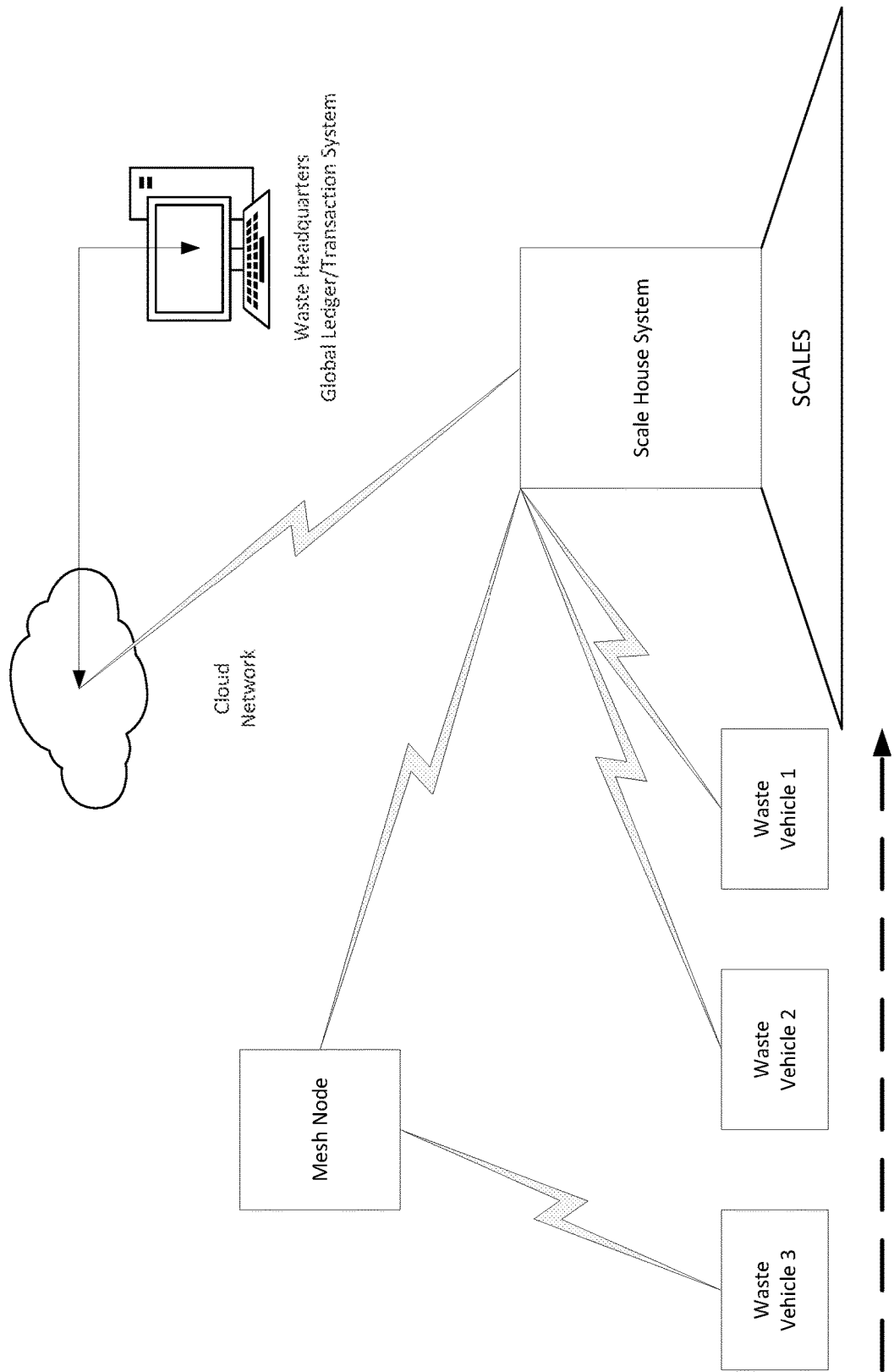
FIG. 2 illustrates another aspect of the invention where a transaction location (e.g., scale house, warehouse entrance, venue ease way, parking lots, entrances, etc.) provides a system of software and sensors that allow the reading of unique information from devices.

FIG. 2 illustrates another aspect of the invention where a transaction location (e.g., scale house, warehouse entrance, venue ease way, parking lots, entrances, etc.) provides a system of software and sensors that allow the reading of unique information from devices.

The transaction location is an area in which a secured reader is in place and it has an network (e.g., internet) connection back to the described software solution. The following functions are generally performed at the transaction location: Queue incoming orders; Verify contents of containers; Authenticate vehicle or user entering grounds; Verify assets moving in/out of location; provide electronical catalog of services offered; Weight, Measure or count contents coming in/going out; Log all activity; Decrypt IoT based data (Data is encrypted so that only assets belong to the system are aware and securely accesses). The following breaks down the information collected and the process of collection. First, queuing, where one or more vehicles approach a defined area (defined by a geospatial based location or area, the system communicates current queue times and backlog back to incoming vehicles to provide accurate ETA's). Utilizing authenticated data from sensors like lower power Bluetooth beacons or any device that can transmit an encrypted and authorizable data feed, not just a static id. The described system and method provides each vehicle and/or driver with an established profile that is used to authenticate and authorize the transactions.

Consider the following example, a vehicle (truck) leaves a construction site with a 30 yd container full on the back of the truck. After the container is loaded onto the truck, a "pickup complete" signal is sent to the system, this may comprise an automatic system that is sent based on sensors on the container and/or the truck, or it may comprise the driver making an entry into a smart device that is in communication with the system. When the complete pickup signal is received, the software of the system informs the driver that it is, for example, a 30-minute trip to get onto the scale of the landfill. The system also estimates and displays his time for arrival at the next stop to be in one hour and 10 mins. The following data is captured by the connected system: (1) The scale house is looking for all broadcasts from the on-board driver system to determine location from scale house. (2) The scale house also reports a time back based on the backlog of trucks in the yard (that have come through the scale). (3) The driver is receiving the next stop location based upon the scale house/landfill the system directs him/her to from the work order.

When the driver arrives at the scales house, through a network of sensors, cameras (drones or fixed) and driver authorization, the scale house automatically logs him/her in queue and direct the truck onto the scale. Once the driver is on the scale and stops, the following occurs: the driver is prompted for a fingerprint, retinal or simple PIN (some form of identification) to certify that who they are; the scale house receives a response from the authentication of the driver to then read the truck and asset information; asset meta information access is requested from the global ledger/transaction system and remains valid for a certain predefined number of days; once asset ID and truck verified, a picture of content is captured with the transaction by fixed cameras, drones or special types of cameras that can analyze composition of the contents through the container; the driver is the directed to the yard to dump items in container; the driver then returns to scale house and re-authenticates if a profile for vehicle and asset is not on file (for trucks and assets that have profiles that store their weight, these vehicles are able to skip coming back across the scale; all information and data exchanged is transmitted back to central ledger for interaction verification; and data required to execute a smart contract on a blockchain infrastructure (or other security measures) is properly formatted and submitted to the network.

B. Asset and Service Automation Mobile

Described herein are asset management and service tracking systems, devices, and methods that assist with the classification, transporting, servicing and billing of an asset. The disclosed systems, devices and methods are focused around any type of waste service (commercial, residential, equipment, toilets and others) that have been requested by a customer or provided through contractual means.

Figure 3:
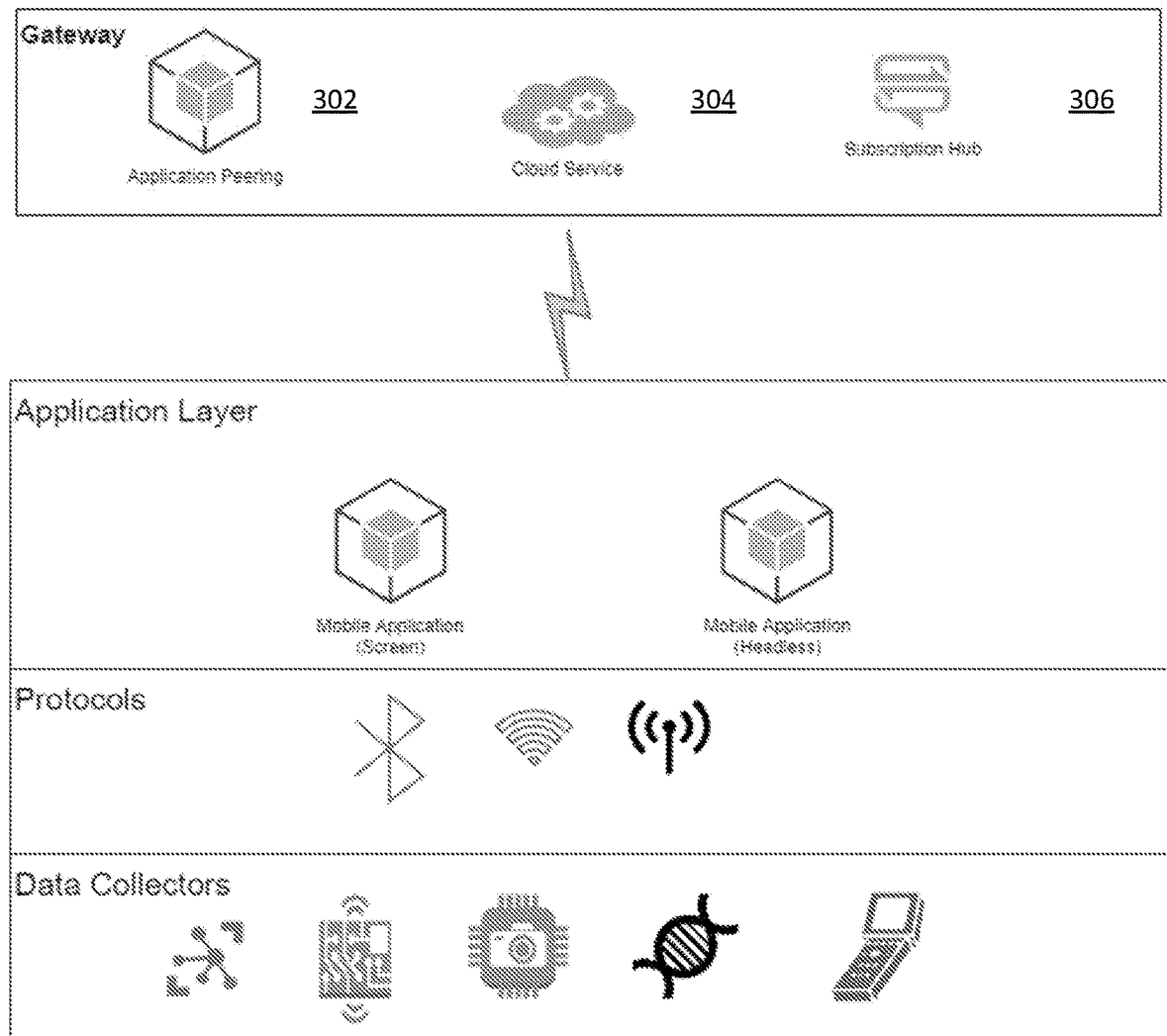
FIG. 3 is an illustration showing a transport/driver view for classifying and tracking the type of waste that has been requested for processing.

The ability to classify and track the type of waste that has been requested for processing is handled through one of the scenarios as shown in FIG. 3. As shown in FIG. 3, three communication gateways are peer device 302, centralized cloud service 304, or a subscription 306 to an event-based messaging broker.

The peer to peer network 302 is for customers that use a mobile application (with or without a screen) and provides for drivers who drive company-owned vehicles or perhaps own their own trucks or handle service requests on demand. In this environment, each device is registered to a device repository. When the mobile application comes online the IP or protocol identifier (can be multiple) is registered in the repository. If a device requests peering with another device and the user agrees to the pairing request (similar to how Bluetooth works with a generated pin), then information can be shared between the collection of the devices until a device is removed by group (group removal can occur by the owner of the peered network (who started it first) or any user that wants to drop). The information includes current location and other asset information. Collected sensor information, waste type and information and transport details are shared.

In the cloud centralized option 304, the dispatching and management of the assets and service is performed within cloud-based software. All the functionality of the peering option is available in with the data stored into one central database and available for review for all transporters.

A third option illustrated in FIG. 3 is an extension to the cloud service 304 and allows the ability of the cloud customer to allow their customers to subscribe 306 to events. An example for an event would be when a ticket is generated for service, the driver capture weight information or a stop has been skipped because it was not accessible.

With the three options highlighted above, electronic capture and reporting of the information exists in a mobile application. The mobile application runs with or without a screen and one of its primary functions is the bi-directional communication of data between gateways.

Once a device is assigned to a transport (truck, autonomous vehicle, user, etc.), the system provides the ability to guide the user of the application on what actions to perform, what data to collect and what to do with the waste type next.

Once a user logs into device or when a headless device detects movement (through the use of onboard sensors), the system becomes a scanner of sorts looking for registered sensors or other devices. The section below on sensors goes into more detail on the different types we use today and some we are working on custom development of.

The processing of work is started through a request. If it's a new service not already present in the system, the driver is able to request Lat/Long coordinates of his current location and a service tries to populate the site information for them. Additional notes can then be entered.

Figure 4:
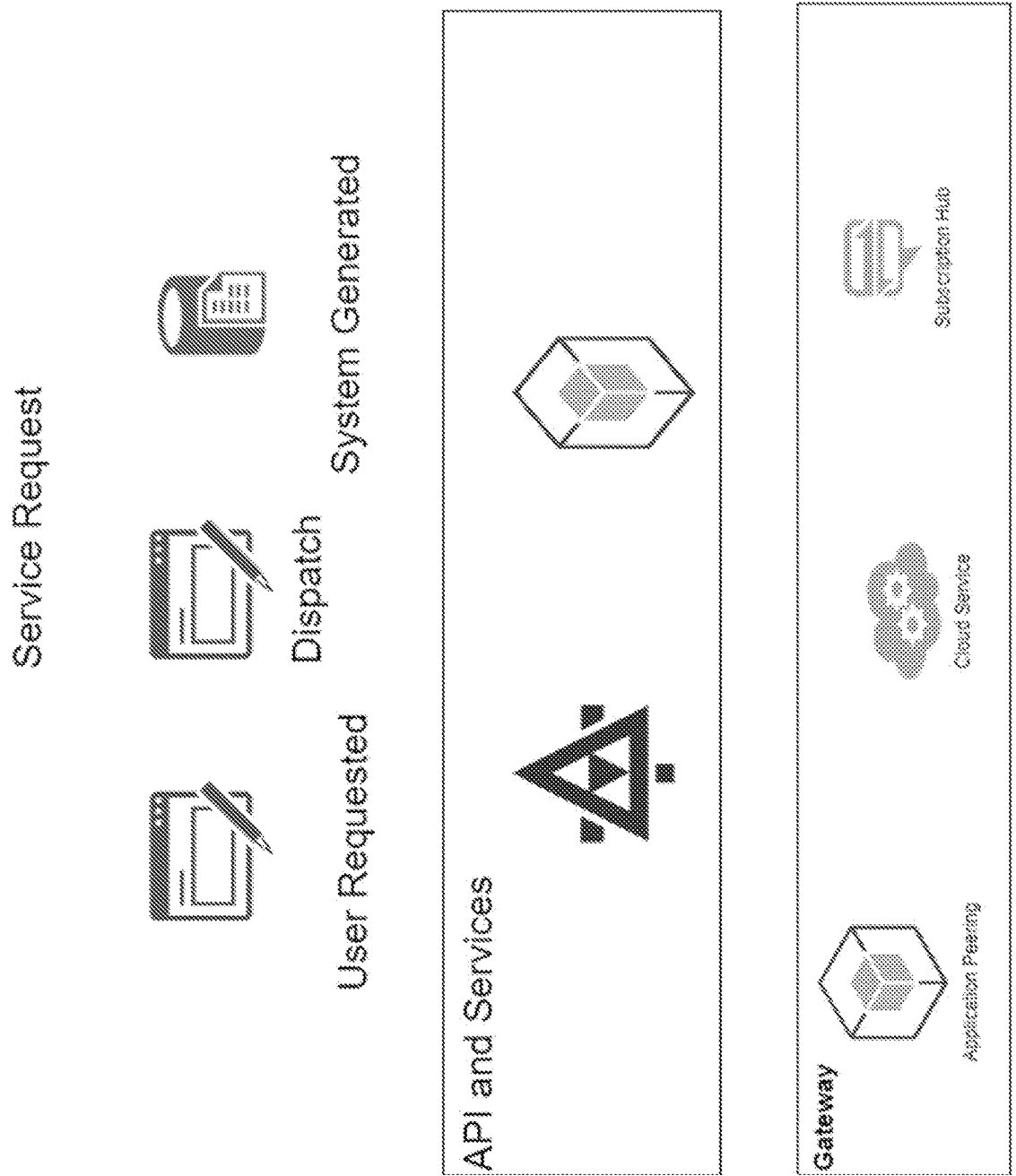
FIG. 4 is an overview illustration of a process of receiving or creating an electronic service record.

Once a service location is established (will be already assigned to driver if running from cloud solution), the driver is then able to service that location. FIG. 4 outlines the process of receiving or creating the electronic service record. Service requests can also be generated automatically from a pre-scheduled events or through thresholds set in the system related to number of hauls, tonnage, completion date (the system estimates the effort through an internal algorithm to establish this date that looks at history on the job site to determine if based on the mean count of hauls and weight if you are on track to complete job before date).

Data to build a service order is based on the type of material being collected, the service that is going to be performed (typically for rental equipment but could be any type of machinery that performs a service at a site location) or what needs to be delivered or removed.

Figure 5:
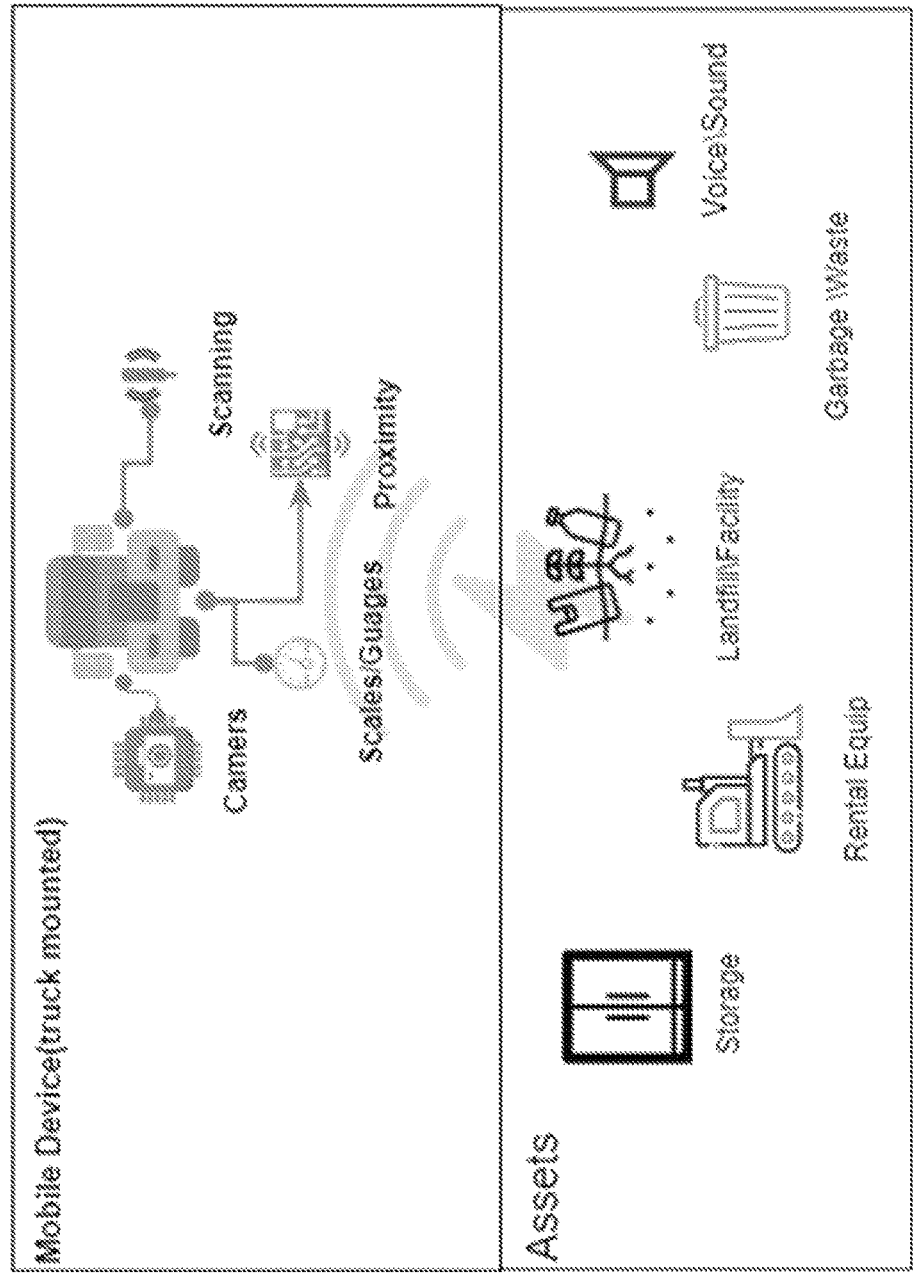

FIG. 5 outlines a scenario in which a driver is sent a service request and is using a vehicle-mounted device with a screen, which includes the following sensors and connected devices:

camera front, camera rear, low power Bluetooth receiver, GSM, strain gauges wired to axles connecting to on board analog to digital transmitter using Bluetooth.

Figure 6:
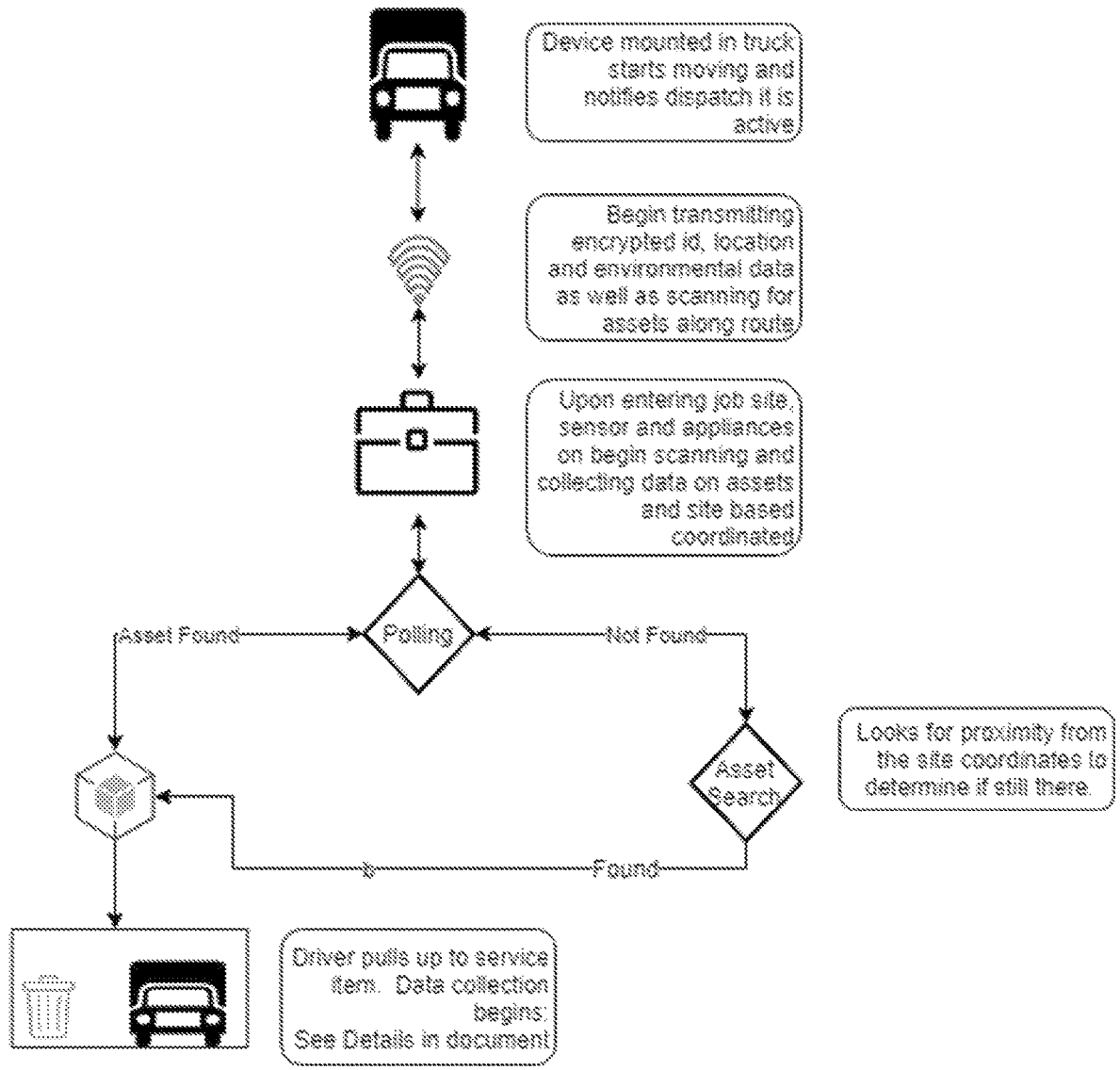
FIG. 6 is a flowchart that illustrates the flows and activities of a vehicle-mounted device, such as the device shown in FIG. 5.

FIG. 6 in traces the flow and activity of the device. Once the asset is found (if not found, an exception is recorded as well as a reason), the sensors start transmitting and or displaying data. In this scenario, the driver is servicing a 30 yd roll off container that has a beacon on board that has sensor that transmits the following back to the mobile application: when can is lifted off the ground (velocity and angle of lift from an on-board accelerometer provide this information); request metadata from the device (through use of a wireless protocol like Bluetooth or WiFi), that provides information such as last serviced on, last serviced by, a unique id and a hashed value that containers the last owner's ID as previously recorded in the system; updates metadata with current driver, service time; the axles on the truck are wired with a strain gauge or other type of weight collection device to provide an rough weight of the load (the profile for the truck maintains tare weight). The weight of this data, in this scenario, is transmitted wirelessly after being converted to digital format using a signal conversion box inside the truck cab; and the driver then gets out to perform the manual actions related to hooking and securing the container. The device in the truck continues to track the time between entry to site, coming within five yards of can, the lifting of the can, the amount of time the truck has not moved and finally, once the device begins moved again, the time to the landfill/ transfer station, yard or other designated location (container staging area for example).

The electronic instrumentation of the previous process simplifies the drivers tasks related to servicing the right asset (asset id was confirmed by the system), an estimated amount for the weight (through the strain gauge based system), the metadata capture from the container can provide an additional validation but more importantly provides the driver with contact information of the previous driver in case there is a questions (reducing calls back to dispatch or trying to hunt down job site foreman's for example). The ability and collection of the configurable time sequences around the driver's activities to perform the services can later be used for analysis to add training, productivity and contractual service obligations.

Figure 7:
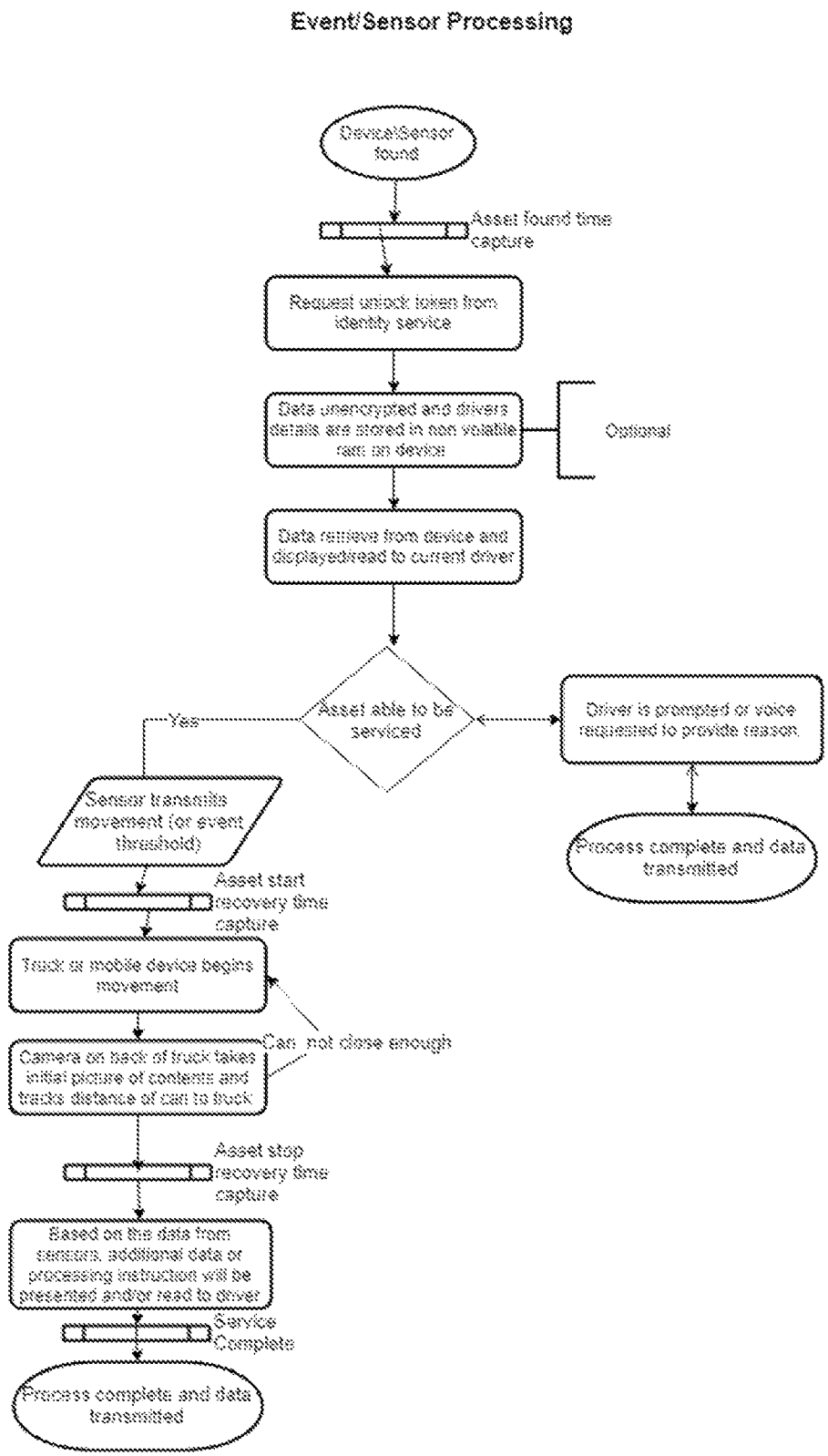
FIG. 7 illustrates an exemplary workflow used for the automation of data collection and process enablement.

FIG. 7 illustrates an exemplary workflow used for the automation of data collection and process enablement. FIG. 7 illustrates steps in an automated method of tracking and servicing assets and\or their contents through the combination of sensors and data intelligence from current and historical collections. The method involves collecting data from sensors on the devices or mounted on collecting units (trucks, specialized machinery, people, etc.). The type of data collected contains, for example, who last serviced, when it was serviced and any specific instructions that can be accessed with proper authorization (per request or for a time series to allow operations when disconnected). The tracking of the data for the asset can be shared between connected devices through a peer networking using IPV4 and/or IPV6 over an encrypted socket interface. For customers using the central gateway, the data is stored inside of a central repository. Data can be correlated back to driver/servicing profiles that can later be used to determine things like driver productivity, cost breakdown for service different types of assets and contents, etc.

Figure 8:
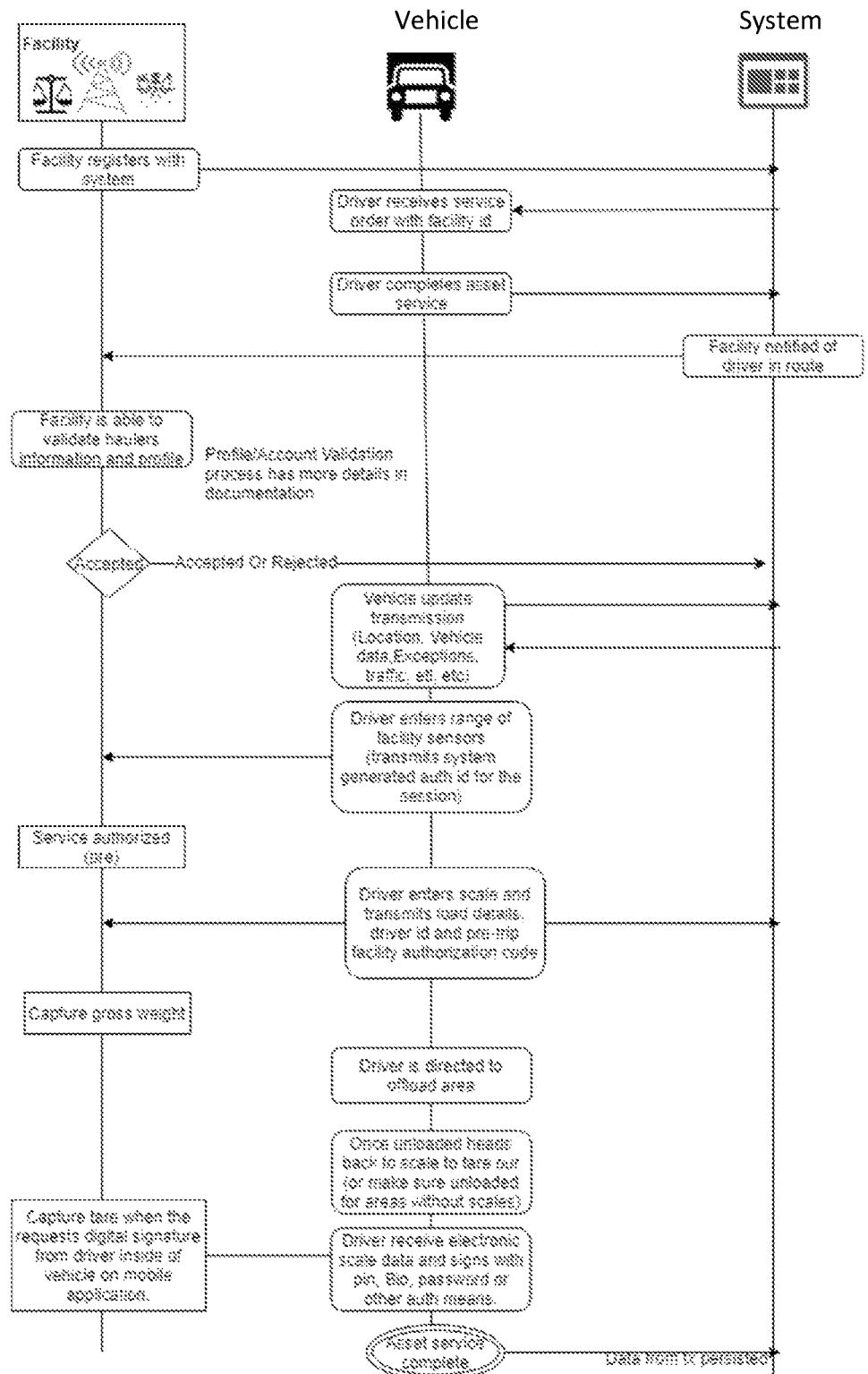

In other aspects, the client comprises a fixed location such as waste facilities (scale houses), landfills, asset yards, and the like. In this scenario, the location (e.g., client) is always scanning for the incoming vehicle that the driver is logged in with. FIG. 8 shows an outline of the process.

Generally, disclosed and described herein are electronic and automated methods and systems of data collection for tracking an asset that needs to have service performed as directed by a user directly, a peer device or through our services-oriented software. The asset is tracked via a unique identifier, based on the number of deliveries and removals to a service location or through manual confirmation from the mobile software. Once an asset is identified and associated to the service order request the driver electronically requests instructions on where to service the contents of the asset. The driver's mobile unit has the capabilities to interface to additional accessories and sensors onboard the unit to capture or scan data such as estimated weight, if the container needs to have a tarp on it, is the container in an overflow status, capture environmental imagery for context via camera(s), validate an asset is properly serviced by checking speed or movement of truck and/or asset together if the assets are using our sensor packs, and various other conditions we are able to capture with limited to no interaction for the driver.

When the timing event is fired and recorded that the asset recovery is complete and it is required to go to another location for service, a facility running the disclosed software is sent a request for dumping, disposing and/or processing of the contents in the asset. This preauthorization allows the facility to automatically notify the hauler of various things like need to prepay, facility is down, facility does not take the material type being sent, price per unit of measure, additional fee structures, denial of service, etc. Based on the response the driver may be presented through a visual or our audio interface on what to do next (if denied admission, call dispatch, do nothing because they are ok with you, locate a closer or faster facility in case that one is backed up, etc.)

As the asset is under way to its designated destination, it continues to transmit location data to record marking information in its route and also performs real time inventory auditing and validation as it travels by scanning the areas around it for sensor packs (e.g., mesh nodes) broadcasting encrypted identifiers and metadata. This automated inventory management function can also push the data from the asset back to last know location to help locate lost or stolen containers.

During the travel period, the driver has the manual ability to stop for service or other activities. The logging of the vehicle data is also sent along with the location and is sent out via broadcast depending on model (Peer to Peer, none or central repository). The importance of this data is used by the system internally to build a driver productivity and risk profile based on habits (breaking, acceleration, grating in turns, speed, inspection, break\fix, etc.)

Once the driver gets into an area around the facility, the device communicates the start of the servicing request and identify to the facility that it is within x amount of range. A validation occurs requiring the driver using our mobile software to authenticate who they are (with bio scan, pin number, two-factor authentication, etc.) that acts as a digital signature. The system transmit the preauthorization code with the response to the facilities request to automate backend processing.

As the driver stops on the scale, software in the facility can transmit any specific instruction to the driver (via chat, voice and by pre-programmed responses like, "Go the back of lot B to unload" based on material type). In some instances, software in the facility also receives information from a scanner that is authorized to read the asset identifier to record on the electronic weight ticket as well as physically scan and confirm that driver performed the authorization. Modules that extend the facilities functionality include cameras that can automatically take pictures and save/send along with weight tickets, authorization systems for drives as then pull onto the scale to physically confirm identity (bio scanner, camera, pin/password, etc.), material type scanners.

Once a vehicle enters the scale to tare out, a final validation occurs within the software that reads and confirms the asset again and then generates a prompt in cab (visual or verbal) to digitally sign the weight ticket. This then sends the electronic ticket and any associated data along with it back to the driver's system (depending on operation mode). The weight ticket is also digitally signed to prevent tampering and becomes a legal artifact of the service. For systems that are running blockchain or distributed ledger environments, this serves as a executed contract and billing can occur immediately. In the described cloud operation mode, all AR/AP related functions around that asset and or the items serviced in it can be generated and performed through the cloud.

C. Computing Environment

Figure 9:
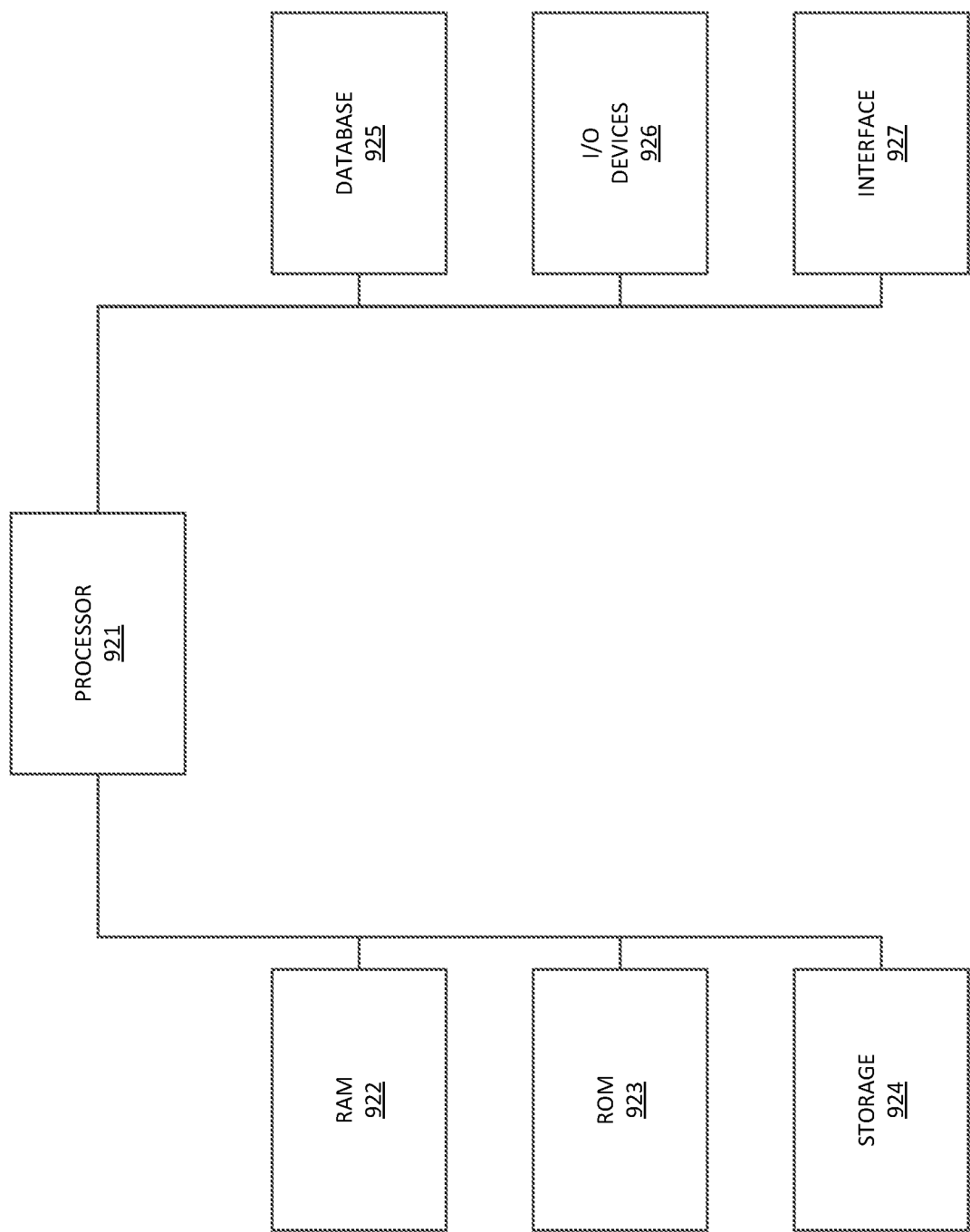
FIG. 9 illustrates an exemplary computer or computing device that may comprise all or a portion of aspects of embodiments of the invention.
Figure 10A:
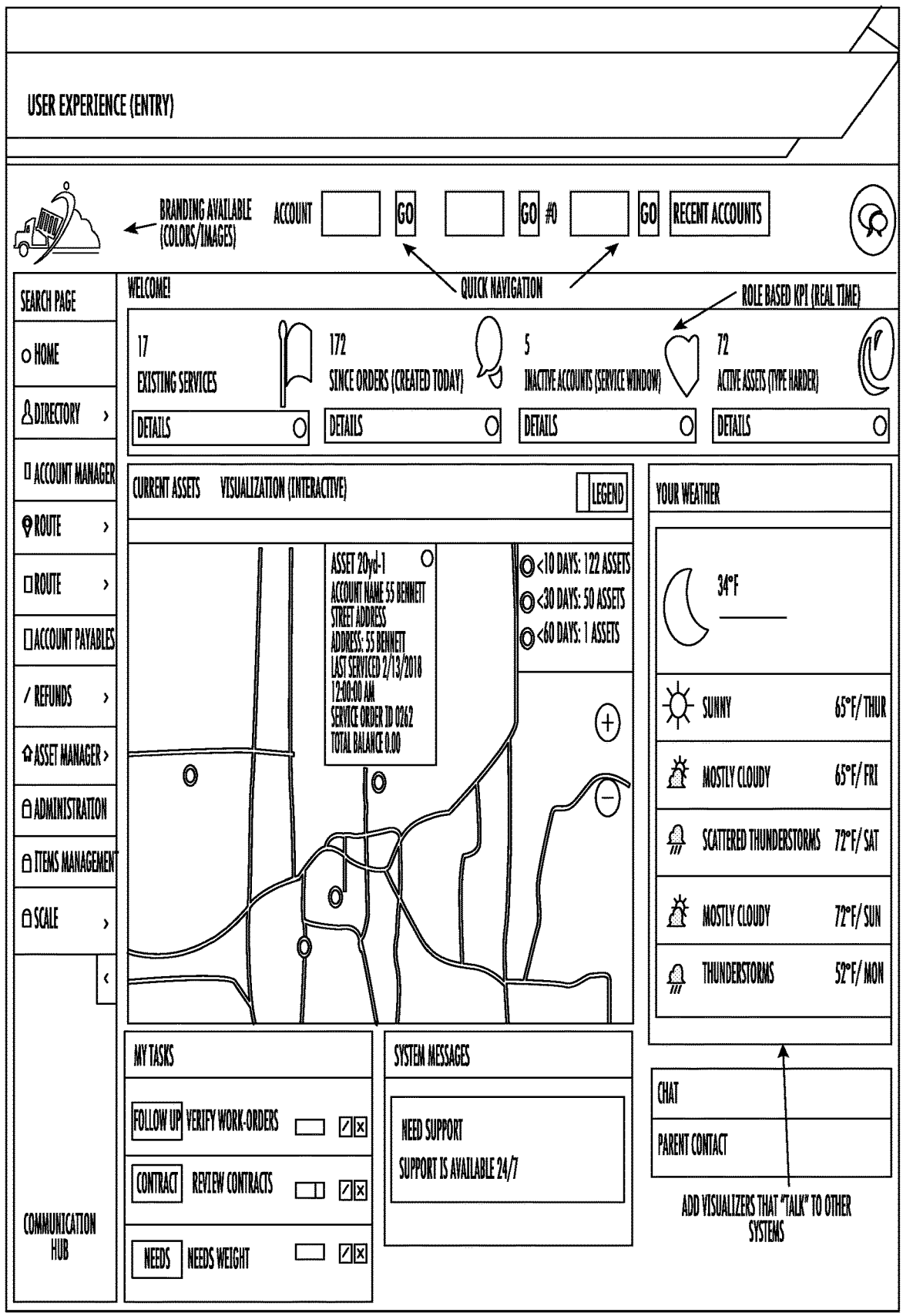
Figure 10D:
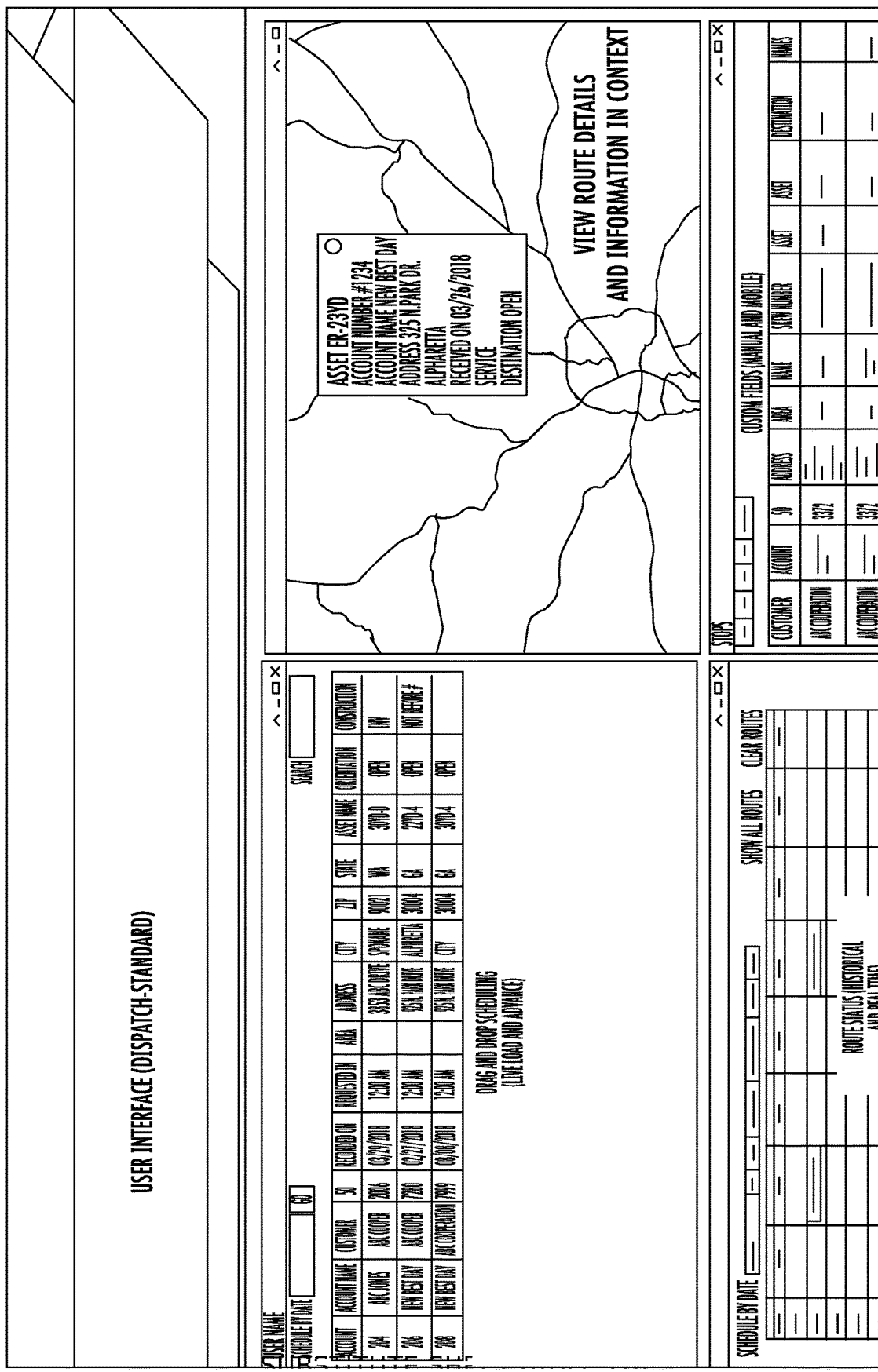

FIG. 9 illustrates an exemplary computer or computing device that can be used for some or all of the features described herein. All or a portion of the device shown in FIG. 9 may comprise all or a portion of any of the components described herein that may include and/or require a processor or processing capabilities. As used herein, "computer" may include a plurality of computers. The computers may include one or more hardware components such as, for example, a processor 921, a random access memory (RAM) module 922, a read-only memory (ROM) module 923, a storage 924, a database 925, one or more input/output (I/O)

devices 926, and an interface 927. Alternatively and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 924 may include a software partition associated with one or more other hardware components. It is understood that the components listed above are exemplary only and not intended to be limiting.

Processor 921 may include one or more processors, each configured to execute instructions and process data to perform one or more functions associated with a computer for asset verification/validation and automated transaction processing. Processor 921 may be communicatively coupled to RAM 922, ROM 923, storage 924, database 925, I/O devices 926, and interface 927. Processor 921 may be configured to execute sequences of computer program instructions to perform various processes. The computer program instructions may be loaded into RAM 922 for execution by processor 921.

RAM 922 and ROM 923 may each include one or more devices for storing information associated with operation of processor 921. For example, ROM 923 may include a memory device configured to access and store information associated with the computer, including information for identifying, initializing, and monitoring the operation of one or more components and subsystems. RAM 922 may include a memory device for storing data associated with one or more operations of processor 921. For example, ROM 923 may load instructions into RAM 922 for execution by processor 921.

Storage 924 may include any type of mass storage device configured to store information that processor 921 may need to perform processes corresponding with the disclosed embodiments. For example, storage 924 may include one or more magnetic and/or optical disk devices, such as hard drives, CD-ROMs, DVD-ROMs, or any other type of mass media device.

Database 925 may include one or more software and/or hardware components that cooperate to store, organize, sort, filter, and/or arrange data used by the computer and/or processor 921. For example, database 925 may store information and instructions related to asset verification/validation and automated transaction processing. It is contemplated that database 925 may store additional and/or different information than that listed above.

I/O devices 926 may include one or more components configured to communicate information with a user associated with computer. For example, I/O devices may include a console with an integrated keyboard and mouse to allow a user to maintain a database of asset information, and the like. I/O devices 926 may also include a display including a graphical user interface (GUI) for outputting information on a monitor. FIGS. 10A-10D illustrate exemplary GUIs for the disclosed system and methods. I/O devices 926 may also include peripheral devices such as, for example, a printer for printing information associated with the computer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 927 may include one or more components configured to transmit and receive data via a communication network, such as the Internet, a local area network, a workstation peer-to-peer network, a direct link network, a wireless network, or any other suitable communication platform. For example, interface 927 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of asset retrieval using authentication, said method comprising:
   receiving, by a mobile device located in a vehicle, a request for service; confirming and accepting, by the mobile device, the request for service;
   receiving, by the mobile device, information identifying at least the asset and a location of the asset;
   sending, by the mobile device, tracking information about the vehicle after acceptance of
   the request for service, wherein the tracking information is received by a computing system;
   receiving, by the mobile device, a request for authentication from a smart device attached to or proximate to the asset as the vehicle approaches the asset;
   responding, by the mobile device, to the request for authentication from the smart device; and
   if the smart device attached to or proximate to with the asset receives a correct response from the mobile device, then transmitting meta information from the smart device to the mobile device; or
   if the smart device attached to or proximate to with the asset receives an incorrect response or no response from the mobile device, then not transmitting any information from the smart device to the mobile device.

2. The method of claim 1, wherein the smart device associated with the asset stores a globally unique identifier and the meta information about the asset, wherein the meta information about the asset can include one or more of last date the asset was serviced, last location of the asset, last service order number for the asset, weight of the asset, and volume of the asset.

3. The method of claim 2, wherein once the smart device associated with the asset receives a correct response, the globally unique identifier and the meta information about the asset is transmitted from the smart device to the mobile device.

4. The method of claim 3, wherein the globally unique identifier and the meta information about the asset is transmitted from the mobile device to the computing system.

5. The method of claim 4, wherein the globally unique identifier and the meta information about the asset is transmitted from the mobile device to the computing system using one or more of a peer-to-peer system, a wireless cloud-based network, or a cellular system.

6. The method of claim 4, wherein the globally unique identifier and the meta information about the asset transmitted from the mobile device to the computing system is used by a global ledger and transaction system executing on the computing system, which allows one or more of an owner or lessee of the asset, contents of the asset, or type of the asset to be identified.

7. The method of claim 6, wherein additional information is transmitted from the mobile device to the computing system including one or more of vehicle identification, distance to arrival of location for unloading the asset or contents of the asset; weight of material contained in asset where such weight information may come from one or more of on-board vehicle scales, pre-weighed data stored in the smart device, or cumulative amount of material collected in the asset.

8. The method of claim 7, wherein the global ledger and transaction system creates an invoice for the owner or lessee of the asset based on globally unique identifier, the meta information and the additional information.

9. The method of claim 8, wherein the invoice is electronically transmitted to the owner or lessee of the asset.

10. The method of claim 1, wherein the asset comprises a trash bin, a ruggedized pod, or anything that holds items.

11. The method of claim 1, wherein the smart device comprises a GPS transmitter and if the smart device associated with the asset receives an incorrect response or no response from the mobile device, and the asset is moved, the asset is flagged as stolen/compromised.

12. The method of claim 11, wherein the smart device sends an alert signal when it is flagged as stolen/compromised.

13. The method of claim 1, wherein the request for authentication from the smart device associated with the asset as the vehicle approaches the asset is a request for multi-factor authentication.

14. The method of claim 1, wherein the mobile device is connected to one or more of a display screen, a camera mounted to view a front of the vehicle, a camera mounted to view a rear of the vehicle, a low power Bluetooth receiver, a cellular transceiver, a GPS, and one or more strain gauges wired to axles of the vehicle, wherein the one or more strain gauges are connected to an on-board analog to digital transmitter using Bluetooth.

15. The method of claim 1, wherein the asset is loaded onto the vehicle and a "pickup complete" signal is sent to the computing system from the mobile device.

16. The method of claim 15, wherein the "pickup complete" signal is automatically generated by the mobile device based on one or more sensors located on the asset or one or more sensors located on the vehicle, or based on one or more sensors located on the asset and one or more sensors located on the vehicle.

17. The method of claim 15, wherein the "pickup complete" signal is generated by the mobile device based on a driver of the vehicle making an entry into the mobile device that is in communication with the system.

18. The method of claim 15, wherein when the pickup complete signal is received by the computing system, software executing on the computing system sends information to a driver of the vehicle using the mobile device of a time required to take the asset to a desired location.

19. The method of claim 18, wherein the desired location is a scale of a landfill.

20. The method of claim 19, wherein the scale is associated with a scale house computing system and the scale house computing system receives a broadcast from the mobile device when the mobile device is within a certain range of the scale to determine location from scale house, the scale house computing system reports a time back to the mobile device based on a backlog of vehicles trying to access the scale.

21. The method of claim 20, wherein the mobile device communicates directly with the scale house computing system.

22. The method of claim 20, wherein the scale house computing system communicates with the computing system and the computing system communicates with the mobile device.

23. The method of claim 20, wherein when the vehicle arrives at the scale house, through a network of sensors, cameras (drones or fixed) and driver authorization, the scale house computing system automatically logs the vehicle in queue and direct the vehicle onto the scale.

24. The method of claim 23, wherein once the vehicle is on the scale and stops, the driver is prompted by the mobile device for a fingerprint, retinal or simple PIN (some form of authentication) to certify who they are; the scale house computing system receives a response from the authentication of the driver to then read from the mobile device vehicle and asset information which is verified using the computing system; once the vehicle and asset information is verified, a picture of asset contents is captured by fixed cameras, drones or special types of cameras that can analyze composition of the contents through the container and a weight of the vehicle with the asset and contents of the asset is measured by the scale; and the driver is directed by the mobile device to a location to dump items in the asset.

25. The method of claim 24, wherein the driver returns the unloaded vehicle to the scale and re-authenticates to determine an empty weight of the vehicle and a weight of the items dumped is calculated.

26. The method of claim 24, wherein an empty weight of the vehicle is on file and a weight of the items dumped is calculated based on subtracting the empty weight of the vehicle from the weight of the vehicle with the asset and contents of the asset as measured by the scale.

27. The method of claim 25, wherein all information and data exchanged between the mobile device and the scale house computing system is transmitted to the computing system and stored in a central ledger system for interaction verification; and data required to execute a smart contract is properly formatted and submitted to a customer.

28. The method of claim 27, wherein the smart contract is based on a blockchain infrastructure or other security measures.

* * * * *